United States Patent [19]

Takashima et al.

[11] Patent Number: 5,086,136
[45] Date of Patent: Feb. 4, 1992

[54] PROCESS FOR PRODUCING HIGH TRANS LOW VINYL CONJUGATED DIENE (CO)POLYMER

[75] Inventors: Akio Takashima, Kameyama; Iwakazu Hattori, Aichi; Takashi Imamura, Suzuka, all of Japan

[73] Assignee: Japan Synthetic Rubber Co., Ltd., Tokyo, Japan

[21] Appl. No.: 502,172

[22] Filed: Mar. 30, 1990

[30] Foreign Application Priority Data

Apr. 7, 1989 [JP] Japan .................. 1-086720

[51] Int. Cl.$^5$ .............................. C08F 4/52
[52] U.S. Cl. .................. 526/177; 526/173; 526/335; 526/340
[58] Field of Search ............ 526/177, 180, 181, 335, 526/340, 173

[56] References Cited

U.S. PATENT DOCUMENTS

| | | | |
|---|---|---|---|
| 4,080,492 | 3/1978 | deZarauz et al. | 526/177 |
| 4,129,705 | 12/1978 | de Zarauz | 526/175 |
| 4,424,322 | 1/1984 | Hattori et al. | 526/175 |
| 4,933,401 | 4/1990 | Hattori et al. | 526/181 X |

FOREIGN PATENT DOCUMENTS

| | | |
|---|---|---|
| 52-30543 | 8/1977 | Japan . |
| 52-48910 | 12/1977 | Japan . |
| 56-112916 | 9/1981 | Japan . |
| 56-5401 | 10/1981 | Japan . |
| 57-34843 | 7/1982 | Japan . |
| 59-17724 | 4/1984 | Japan . |
| 60-2323 | 1/1985 | Japan . |
| 60-26406 | 6/1985 | Japan . |
| 62-35401 | 8/1987 | Japan . |
| 62-215616 | 9/1987 | Japan . |

OTHER PUBLICATIONS

Polymer Sci., USSR, 18, 1976, pp. 2325–2330, Z. M. Baidakova et al., "Butadiene Polymerization in the Presence of Initiators of the Type Barium Alcoholates-Organomagnesium Compound".
Macromol. Chem., 156, 1972, pp. 31–38, P. Maleki, et al., "Etude du Mecanisme Des Polymizarisations Amorcees Par Les Metaux Alcalino-Terreux".
Journal of the Chemical Society of Japan (Pure Chemistry Section), 1972, No. 2, pp. 447–453, R. Fujio, et al., "COPOLYMERIZATION OF BUTADIENE AND STYRENE WITH N-BUTYLLITHIUM AND ALKALINE-EARTH METAL COUMPOUND MITURE".
Journal of the Chemical Society of Japan (Industrial Chemistry Section), 72, pp. 994–998, (with partial English translation), T. Narita, et al., "COPOLYMERIZATION REACTION OF STYRENE, BUTYLLITHIUM-POLYETHER SYSTEM CATALYST".
J. Macromol. Sci. Chem. A4(4), pp. 885–896, Jul. 1970, T. Marita, et al., "REACTRIVITY OF N-BUTYLLITHIUM-$(CH_3)_2NCH_2CH_2OLI$ SYSTEM AS CATALYST FOR COPOLYMERIZATION OF STYRENE WITH 1,3-BUTADIENE".
Journal of the Chemical Society of Japan (Pure Chemistry Section), pp. 440–446, 1972, (with English Abstract), R. Fujio, et al., "HOMOPOLYMERIZATION OF BUTADIENNE AND ISOPRENE AND COPOLYMERIZATION OF BUTADIENE WITH STYRENE BY USING ORGANOALKALINE-EARTH ...".

Primary Examiner—Fred Teskin
Attorney, Agent, or Firm—Oblon, Spivak, McClelland, Maier & Neustadt

[57] ABSTRACT

A process for producing a high trans low vinyl conjugated diene (co)polymer, comprising polymerizing at least one conjugated diene alone or in combination with at least one alkenyl compound using a catalyst composition comprising (a) a barium compound, (b) an organoaluminum compound, (c) an organolithium compound and (d) a hydroxyl group-containing organic compound. This process enables the easy production of a high trans low vinyl conjugated diene (co)polymer having a high trans 1,4 bond content, a low vinyl bond content and a high molecular weight, at a high polymerization activity.

26 Claims, No Drawings

PROCESS FOR PRODUCING HIGH TRANS LOW VINYL CONJUGATED DIENE (CO)POLYMER

This invention relates to a process for producing a high trans low vinyl conjugated diene (co)polymer. More particularly, this invention relates to a process for producing a high trans low vinyl conjugated diene (co)polymer having a high 1,4-bond content and a low 1,2 or 3,4 bond (hereinafter referred to as vinyl bond) content, by polymerizing monomer(s) comprising at least one conjugated diene as an essential component with a catalyst composition consisting essentially of a barium compound, an organoaluminum compound, an organolithium compound and a hydroxyl group-containing organic compound.

As a result of recent increase of the performance of automobiles, an enhancement of processability, abrasion resistance, mechanical properties and the like of rubber materials for tire and the like has recently been strongly demanded.

These properties cannot be sufficiently satisfied by a high cis-1,4 polybutadiene obtained with a conventional Ziegler type catalyst, a low cis-1,4 polybutadiene and styrene-butadiene copolymer obtained with a lithium catalyst and a polybutadiene and styrene-butadiene copolymer obtained by emulsion polymerization.

On the other hand, besides the above polymers, a high trans-1,4 polybutadiene and a styrene-butadiene copolymer are known; however, these polymers are unsatisfactory in physical properties of their vulcanizates and their production is very difficult. Therefore, these polymers cannot be practically used.

As conventional catalysts enabling a conjugated diene to be copolymerized with an alkenyl aromatic compound to produce a high trans-1,4 conjugated diene copolymer, there are known the following alkaline earth metal-based catalysts, particularly barium-based catalysts:

(I) Catalyst systems comprising a barium-hetero atom bond-containing compound and an organometal as principal components (1) Japanese Patent Application Kokoku No. 52-8910 discloses copolymerization of styrene with 1,3-butadiene with a polymerization catalyst consisting of a barium tertiary alkoxide and dibutylmagnesium; however, the polymerization activity is low in this reaction.

(2) Japanese Patent Application Kokoku No. 56-5401 discloses copolymerization of styrene with 1,3-butadiene with a polymerization catalyst consisting of an organolithium and a barium compound represented by the formula:

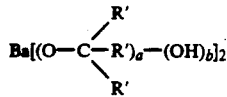

wherein three R"s may be the same or different and at least one R' is methyl or cyclohexyl and the remaining R' or R"s are selected from alkyl groups having 1-6 carbon atoms and cyclohexyl, and the a/b molar ratio is about 97.5/2.5 to 90/10; however, introduction of —OH group into the barium compound requires a very complicated procedure, and the obtained copolymer has a trans-1,4 bond content of about 80% or less and is not suited for practical use.

(3) Japanese Patent Application Kokoku No. 52-30543 discloses copolymerization of styrene with 1,3-butadiene using, as a polymerization catalyst, an organolithium, a barium compound and an organoaluminum compound.

However, in order to make the trans-1,4 bond content relatively high, it is necessary to increase the amount of the organoaluminum compound used, and the polymer thus obtained has a lowered molecular weight and the proportion of the copolymerized styrene is also lowered.

(4) Meanwhile, Tsuruta et al. have reported copolymerization of styrene with 1,3-butadiene with a catalyst consisting of $R(CH_2CH_2O)_n Li/n$-BuLi or $(CH_3)_2NCH_2CH_2OLi/n$-BuLi [see Journal of the Chemical Society of Japan [Industrial Chemistry Section], 72, 994(1969) and J. Macromol. Sci. Chem., A4, 885 (1970)].

Also, Japanese Patent Application Kokoku No. 57-34843 discloses copolymerization of styrene with butadiene and polymerization of butadiene with a catalyst of a barium compound/organoaluminum compound/organolithium compound/lithium alkoxide system as a result of combination of the above-mentioned Tsuruta et al.'s knowledge with a knowledge from Japanese Patent Application Kokoku No. 52-30543.

(5) Japanese Patent Application Kokai No. 56-112916 discloses polymerization of butadiene with a catalyst of a barium compound/organolithium-magnesium compound/organoaluminum compound system; however, the molecular weight of the obtained polymer is difficult to increase.

(II) Catalyst systems comprising an ate complex of barium as a principal component (6) Fujio et al. have reported copolymerization of butadiene with styrene using, as a polymerization catalyst, an ate complex such as tetrabutylbarium-zinc $(BaZn(C_4H_9)_4)$ or the like [see Journal of the Chemical Society of Japan [Pure Chemistry Section], 440(1972)] and Z. M. Baidakova et al. have reported copolymerization of butadiene with styrene, using, as a polymerization catalyst, an ate complex such as $Ba[Al(C_2H_5)_4]_2$ or the like in a hydrocarbon or a solvent for electron donor (see Polymer Sci., USSR, 16, 2630(1974)]. In the former, there is a problem that the trans-1,4 bond content is about 70% or less which is too low, and in the latter, there is a problem that the polymerization rate is unsatisfactorily low and the monomer conversion is very low, namely 75% when the reaction is conducted at 50° C. for 100 hours.

(7) Japanese Patent Application Kokai No. 60-2323 discloses polymerization of butadiene with a catalyst of an organobarium-aluminum compound (ate complex)/electron donor system as in the above-mentioned method of Z. M. Baidakova et al. However, the polymerization activity is still low and the method cannot be used in practice.

(8) Japanese Patent Application Kokoku No. 59-17724 discloses polymerization of butadiene with a catalyst of an organolithium compound/organobariumaluminum compound (ate complex) system; however, the trans-1,4 bond content of the obtained polymer is low, namely 80% or less and the control of trans-1,4 bond content is not easy.

As discussed above, there are many proposals concerning the process for producing a conjugated diene polymer with a catalyst comprising a barium compound as a principal component. However, they have various problems that the polymerization activity is low, the trans-1,4 bond content of the obtained polymer is low, the control of melting point of crystal is difficult and the control of molecular weight is difficult.

The inventors of this invention have made extensive research to solve the above-mentioned problems to find that when a conjugated diene is polymerized using a catalyst composition comprising four components of a barium compound, an organoaluminum compound, an organolithium compound and a hydroxyl group-containing organic compound, there can be obtained a high trans low vinyl conjugated diene polymer and that according to this process, the control of the trans-1,4 bond content is easy and the polymerization activity is high and the control of molecular weight is also easy.

According to this invention, there is provided a process for producing a high trans low vinyl conjugated diene (co)polymer, which process comprises polymerizing at least one conjugated diene alone or in combination with an alkenyl compound in an inert solvent using a catalyst composition comprising (a) a barium compound [hereinafter referred to as component (a)], (b) an organoaluminum compound [hereinafter referred to as component (b)], (c) an organolithium compound [hereinafter referred to as component (c)] and (d) a hydroxyl group-containing organic compound [hereinafter referred to as component (d)] represented by the general formula (I):

HOR     (I)

wherein R represents an alkyl group of 1-20 carbon atoms, an aryl group of 6-20 carbon atoms, or an organic residue having oxygen and/or nitrogen atoms.

The barium compound used as component (a) in this invention specifically includes barium dimethoxide, barium diethoxide, barium diisopropoxide, barium di-n-butoxide, barium di-sec-butoxide, barium di-tert-butoxide, barium di(1,1-dimethylpropoxide), barium di(1,2-dimethylpropoxide), barium di(1,1-dimethylbutoxide), barium di(1,1-dimethylpentoxide), barium di(2-ethylhexanoxide), barium di(1-methylheptoxide), barium diphenoxide, barium di(p-methylphenoxide), barium di(p-butylphenoxide), barium di(o-methylphenoxide), barium di(p-octylphenoxide), barium di(p-nonylphenoxide), barium di(p-dodecylphenoxide), barium di($\alpha$-naphthoxide), barium di($\beta$-naphthoxide), barium (o-methoxyphenoxide), barium di(m-methoxyphenoxide), barium di(p-methoxyphenoxide), barium (o-ethoxyphenoxide), barium di(4-methoxy-1-naphthoxide), etc. They are used alone or in combination of two or more. Of them, preferable are barium di-tert-butoxide, barium di(2-ethylhexanoxide) and barium di(p-nonylphenoxide).

The organoaluminum compound used as component (b) in this invention is preferably a trialkylaluminum such as trimethylaluminum, triethylaluminum, triisopropylaluminum, tributylaluminum, triisobutylaluminum, trihexylaluminum, tricyclohexylaluminum or the like; however, the organoaluminum compound is not restricted to these trialkylaluminums. Of them, preferable is triethylaluminum.

The organolithium compound used as component (c) in this invention includes ethyllithium, propyllithium, n-butyllithium, sec-butyllithium, tert-butyllithium, hexyllithium, 1,4-dilithiobutane, a reaction product of butyllithium with divinylbenzene, alkylenedilithiums, phenyllithium, stilbenedilithium, isopropenylbenzenedilithium, lithiumnaphthalene, etc. Of them, preferable are n-butyllithium and sec-butyllithium. As the hydroxyl group-containing organic compound used as component (d) in this invention, there is preferably used at least one compound selected from the group consisting of the compounds represented by the following general formulas (II) to (IX):

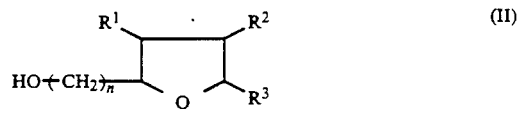
(II)

wherein $R^1$ to $R^3$, which may be the same or different, represent hydrogen atoms, alkyl groups of 1-20 carbon atoms or aryl groups of 6-20 carbon atoms and n represents an integer of 1-3,

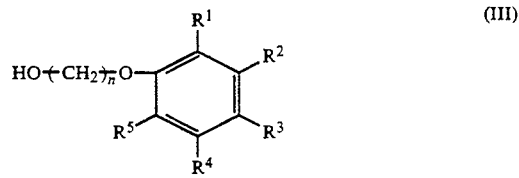
(III)

wherein $R^1$ to $R^3$ have the same meanings as defined above, $R^4$ to $R^5$ have the same meanings as $R^1$ to $R^3$, and n has the same meaning as defined above, $$R^1{}_m N[(CH_2)_n OH]_{3-m} \quad (IV)$$

wherein $R^1$ and n have the same meanings as defined above, and m represents 0 or an integer of 1 or 2,

(V)

wherein $R^6$ represents an alkylene group of 3-10 carbon atoms, and n has the same meaning as defined above,

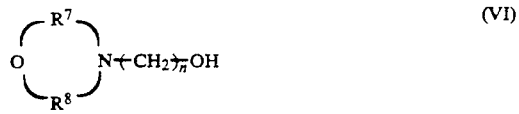
(VI)

wherein $R^7$ and $R^8$, which may be the same or different, represent alkylene groups of 2-5 carbon atoms, and n has the same meaning as defined above,

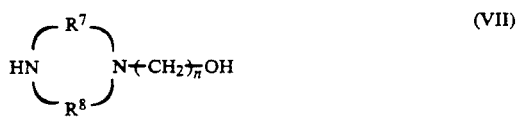
(VII)

wherein $R^7$, $R_8$ and n have the same meanings as defined above,

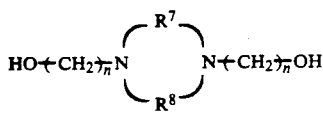

(VIII)

wherein $R_7$, $R^8$ and n have the same meanings as defined above, and

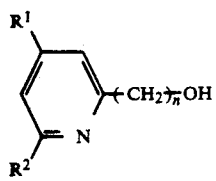

(IX)

wherein $R^1$, $R^2$ and n have the same meanings as defined above.

The hydroxyl group-containing organic compound as compound (d) specifically includes tert-butanol, sec-butanol, cyclohexanol, octanol, 2-ethylhexanol, p-cresol, m-cresol, nonylphenol, hexylphenol, tetrahydrofurfuryl alcohol, furfuryl alcohol, 3-methyltetrahydrofurfuryl alcohol, 4-ethyl-tetrahydrofurfuryl alcohol, an oligomer of tetrahydrofurfuryl, ethylene glycol monophenyl ether, ethylene glycol monobutyl ether, N,N-dimethylethanolamine, N,N-diethylethanolamine, N,N-dibutylethanolamine, N,N-diphenylethanolamine, N-methyldiethanolamine, N-ethyldiethanolamine, N-butyldiethanolamine, N-phenyldiethanolamine, N,N-dimethylpropanolamine, N,N-dibutylpropanolamine, N-methyldipropanolamine, N-ethyldipropanolamine, 1-(2-hydroxyethyl)pyrrolidine, 2-methyl-1-(2-hydroxyethyl)pyrrolidine, 2-methyl-1-(3-hydroxypropyl)pyrrolidine, 1-piperidineethanol, 2-phenyl-1-piperidineethanol, 2-ethyl-1-piperidinepropanol, N-$\beta$-hydroxyethylmorpholine, 2-ethyl-N-$\beta$-hydroxyethylmorpholine, 1-piperazineethanol, 1-piperazinepropanol, N,N'-bis($\beta$-hydroxyethyl)piperazine, N,N'-bis(r-hydroxypropyl)piperazine, 2-($\beta$-hydroxyethyl)pyridine, 2-($\gamma$-hydroxypropyl)pyridine, etc. Of them, preferable are tetrahydrofurfuryl alcohol, N,N-dimethylethanolamine, N,N-diethylethanolamine and 1-piperidineethanol.

The catalyst composition used in this invention is used in such a proportion that the barium compound as component (a) becomes 0.05-1 millimole, preferably 0.1-0.5 millimole in terms of barium atom, per mole of the conjugated diene.

The proportions of components (a), (b), (c) and (d) in the catalyst composition are such that component (a)/component (b)/component (c)/component (d) is 1/1-10/1-10/1-5 (molar ratio), preferably ½-7/3-7/1.2-4 (molar ratio), more preferably ½-6/4-6/1.5-3 (molar ratio).

It is possible to use, during the catalyst preparation, if necessary, a conjugated diene as a further catalyst component in addition to components (a) to (d), in a proportion of 0.05-20 moles per mole of component (a). This conjugated diene is isoprene, 1,3-butadiene, 1,3-pentadiene or the like and is preferably the same as that used as a monomer for polymerization. The conjugated diene used as a catalyst component is not essential but its use gives a higher catalyst activity.

Catalyst preparation is effected by, for example, subjecting components (a) to (d) dissolved in an organic solvent and optionally a conjugated diene to reaction.

In this case, the order of the addition of the individual components is not critical; however, it is preferable to add them in one of the following orders:

component (a)→component (d)→component (b)→component (c)

component (a)→component (b)→component (d)→component (c)

component (d)→component (a)→component (b)→component (c)

component (a)→component (d)→component (c)→component (b)

Component (d) may be handled in the form of a mixture previously prepared by mixing it with component (a) in the given proportions.

It is preferable to mix the catalyst components, react them, subject the reaction product to aging and then use the resulting catalyst in polymerization, in view of enhancing the polymerization activity and shortening the initiation induction period; however, the catalyst components may be charged directly into the reactor containing the monomer and the solvent successively when the monomers are polymerized.

The conjugated dienes which can be polymerized with the catalyst composition of this invention include 1,3-butadiene, isoprene, 2,3-dimethyl-1,3-butadiene, 1,3-pentadine, myrcene, etc. They can be used alone or in combination of two or more. Particularly, 1,3-butadiene and/or isoprene is preferable.

The conjugated diene used in this invention can be copolymerized with an alkenyl compound, for example, an alkenyl aromatic compound such as styrene, $\alpha$-methylstyrene, p-methylstyrene, o-methylstyrene, p-butylstyrene, vinylnaphthalene or the like; vinylpyridine; acrylonitrile; methacrylonitrile; methyl (meth)acrylate; or an acrylic acid ester. The alkenyl aromatic compound is preferable and styrene is most preferable.

The polymerization solvent used in this invention is an inert organic solvent. There can be used, for example, aromatic hydrocarbon solvents such as benzene, toluene, xylene and the like; aliphatic hydrocarbon solvents such as n-pentane, n-hexane, n-butane and the like; alicyclic hydrocarbon solvents such as methylcyclopentane, cyclohexane and the like; and mixtures thereof.

The polymerization temperature is ordinarily −20° to 150° C., preferably 30° to 120° C. The polymerization reaction can be effected batchwise or continuously.

The monomer concentration in the solvent is ordinarily 5-50% by weight, preferably 10-35% by weight.

In production of a conjugated diene (co)polymer according to this invention, in order for the catalyst composition and the obtained (co)polymer not to be deactivated, it is necessary to pay attention to avoiding as much as possible the incorporation of a compound having a deactivating action such as oxygen, water, carbon dioxide gas or the like, into the polymerization system.

Thus, in this invention, a conjugated diene (co)polymer can be produced by polymerizing at least one conjugated diene or copolymerizing at least one conjugated diene with alkenyl aromatic compound such as styrene or the like, with the catalyst composition comprising components (a), (b), (c) and (d) in an inert organic solvent.

The conjugated diene (co)polymer thus obtained has a trans-1,4 bond content in the diene portion of 70 to 90%, preferably 75 to 88% and a vinyl bond content of to 10%, preferably 4 to 9% by weight, and when an alkenyl aromatic compound is copolyemrized, the content thereof in the copolymer is not more than 50% by weight, preferably 5 to 45% by weight, more preferably 10 to 35% by weight.

When the trans-1,4 bond content in the diene portion of the conjugated diene (co)polymer is less than 0% by weight, the (co)polymer is inferior in tensile strength and abrasion resistance, while when it exceeds 0%, the (co)polymer becomes resinous, and hence the hardness becomes high and the physical properties of vulcanized rubber become inferior.

When the vinyl content of the (co)polymer is less than 3%, it is technically difficult to produce such a (co)polymer, while when it exceeds 10%, the resulting (co)polymer becomes inferior in tensile strength and abrasion resistance.

The bound alkenyl aromatic compound content in the (co)polymer produced is preferably 5 to 45% by weight in view of the tensile strength and impact resilience of vulcanized rubber.

The molecular weight of the conjugated diene (co)polymer obtained by the process of this invention can be varied in a wide range, and the polystyrene-reduced weight average molecular weight thereof is usually $5 \times 10^4$ to $100 \times 10^4$, preferably $10 \times 10^4$ to $80 \times 10^4$. When it is less than $5 \times 10^4$, the tensile strength, abrasion resistance, impact resilience and heat-buildup of vulcanized rubber are inferior, while when it exceeds $100 \times 10^4$, the processability becomes inferior and too large a torque is applied to the (co)polymer when it is kneaded on roll or by a Banbury mixer and the compound comes to have a high temperature and is degraded. Also, dispersion of carbon black in the (co)polymer becomes bad and the performance of the vulcanized rubber becomes inferior.

The conjugated diene (co)polymer obtained by the process of this invention has a molecular weight distribution represented by Mw/Mn of 1.1–2.5 (Mw is a polystyrene-reduced weight average molecular weight and Mn is a polystyrene-reduced number average molecular weight). When the molecular weight distribution is less than 1.1, it is technically difficult to produce such a (co)polymer, while when it exceeds 2.5, the resulting (co)polymer becomes inferior in abrasion resistance.

The conjugated diene (co)polymer obtained by the process of this invention has a Mooney viscosity $(ML_{1+4}, 100° C.)$ of usually 10 to 160, preferably 30–120 when it is used as an industrial rubber article. When the Mooney viscosity is less than 10, the physical properties of vulcanized rubber become inferior for the same reason as mentioned as to the weight average molecular weight and, when it exceeds 160, the processability becomes inferior.

The conjugated diene (co)polymer obtained by the process of this invention can be used as a rubber as it is or after having been blended with other synthetic rubbers or natural rubbers; if necessary, extended with a process oil; and then mixed with conventional compounding agents for rubber, such as carbon black (filler), vulcanizing agent, vulcanization accelerator and the like to form a rubber composition. This rubber composition can be vulcanized and then used in the rubber applications requiring mechanical characteristics and abrasion resistance.

This invention is explained in more detail below referring to Examples, which are not by way of limitation but by way of illustration.

In the Examples, parts and % are by weight unless otherwise specified.

In the Examples, various measurements were conducted by the following methods:

Mooney viscosity was measured according to JIS K 6300 under the conditions that preheating was conducted for 1 minutes, measurement was conducted for 4 minutes and the temperature was 100° C.

The microstructure of conjugated diene polymer was determined by an infrared spectrophotometry (Morero method).

Bound styrene content was determined according to an infrared spectrophotometry by preparing a calibration curve.

Weight average molecular weight (Mw) and number average molecular weight (Mn) were determined on polystyrene-reduced basis using a gel permeation chromatograph (GPC) (Type 244 manufactured by Waters Co.).

The crystal melting point [Tm] of conjugated diene polymer was measured by a differential scanning calorimeter (DSC).

As the differential scanning calorimeter, there was used 910 Type Differential Scanning Calorimeter manufactured by Dupont in U.S.A. As the recorder, there was used 990 Type Thermal Analyzer manufactured by Dupont. The amount of sample was 10.0 mg±0.1 mg and 10.15 mg of α-alumina (the reference sample for DSC, manufactured by Shimadzu Corp.) was used on the reference side. The measurement was conducted by placing the sample and the reference in an aluminum pan (manufactured by Dupont) at room temperature, setting the resulting assembly on the DSC, heating it to +180° C., thereafter cooling it to −100° C. at a rate of 10° C. per minute and then analyzing it at a heating rate of 20° C. per minute at a sensitivity of 2 mV/cm.

EXAMPLE 1

In a 100-ml pressure bottle containing a rotor was placed 0.12 millimole of dinonylphenoxybarium as component (a) in a dry nitrogen atmosphere while stirring it with a magnetic stirrer. Then, triethylaluminum as component (b), n-butyllithium as component (c) and diethylaminoethanol as component (d) were added in the molar ratio and addition order shown in Table 1. The mixture was subjected to preliminary reaction (hereinafter referred to as aging) at 80° C. for 15 minutes to prepare a catalyst composition.

In a 300-ml pressure bottle were placed 175 g of cyclohexane and 25 g of 1,3-butadiene in a dry nitrogen atmosphere. Thereto was added the total amount of the above-prepared catalyst composition at one time. The mixture was subjected to polymerization at 70° C. for 90 minutes.

After the completion of the reaction, di-tert-butyl-p-cresol (antioxidant) was added at a proportion of 0.7 g per 100 g of solid rubber. Methanol was added to cause coagulation, after which drying was effected at 40° C. under vacuum to obtain a polybutadiene.

The polymer yield, Mooney viscosity, microstructure of polybutadiene and GPC analysis result are shown in Table 1.

The crystalline melting point [Tm] obtained by DSC had three peaks at 62° C., 44° C. and 33° C.

COMPARATIVE EXAMPLES 1-3

Polymerization was effected by repeating the same procedure as in Example 1, except that there was used a three-component catalyst composition consisting of the same components (a), (b) and (c) as in Example 1 but containing no component (d).

That is, the molar ratio of the catalyst components (a) to (c) was changed in all of Comparative Examples 1-3. The molar ratios were (a)/(b)/(c)=1/4/2 (Comparative Example 1), (a)/(b)/(c)=1/4/3 (Comparative Example 2) and (a)/(b)/(c)=1/5/1 (Comparative Example 3). However, no polymer was obtained.

The conditions used are shown in Table 1.

COMPARATIVE EXAMPLES 4-5

Polymerization was effected by repeating the same procedure as in Example 1, except that there was used a three-component catalyst composition consisting of the same components (a), (b) and (d) as in Example 1 but containing no component (c).

That is, the molar ratio of the catalyst components was (a)/(b)/(d)=1/4/2 in both Comparative Examples 4 and 5 and their addition orders were (a) →(d)→(b) in Comparative Example 4 and (a)→(b)→(d) in Comparative Example 5. However, no polymer was obtained.

The conditions used are shown in Table 1.

COMPARATIVE EXAMPLE 6

Polymerization was effected by repeating the same procedure as in Example 1, except that there was used a three-component catalyst composition consisting of the same components (a), (c) and (d) as in Example 1 but containing no component (b).

That is, the molar ratio of the catalyst components was (a)/(c)/(d)=1/5/2 and their addition order was (a)→(d)→(c). The polymer yield and trans-1,4 bond content were both low as compared with those of Example 1.

The conditions used and the results are shown in Table 1.

COMPARATIVE EXAMPLE 7

Polymerization was effected by repeating the same procedure as in Example 1, except that there was used a three-component catalyst composition consisting of the same components (b), (c) and (d) as in Example 1 but containing no component (a).

That is, the molar ratio of the catalyst components was (b)/(c)/(d)=4/5/2 and their addition order was (d)→(b)→(c). However, no polymer was obtained.

The conditions used are shown in Table 1.

COMPARATIVE EXAMPLES 8-10

Polymerization was effected by repeating the same procedure as in Example 1, except that there was used a three-component catalyst composition in which two of the three components had been aged.

That is, in Comparative Example 8, the same components (a), (b) and (c) as in Comparative Example 1 in which components (a) and (b) had been aged were used; in Comparative Example 9, the same three components (a), (b) and (d) as in Comparative Example 4 in which components (a) and (d) had been aged were used; in Comparative Example 10, there were used the same catalyst composition as in Comparative Example 9, except that the component (d) was replaced by diethylaminoethoxylithium and the two components (a) and (d) had been aged. No polymer was obtained in any of the Comparative Examples.

The conditions used are shown in Table 2.

As is clear from the results of Example 1 and Comparative Examples 1-10, the four-component catalyst system comprising the components (a), (b), (c) and (d) according to the present invention has a high activity and provides a polybutadiene having a very high trans1,4 bond content.

EXAMPLES 2-4

Polymerization was effected by repeating the same procedure as in Example 1, except that the addition order of the catalyst components (a), (b), (c) and (d) was changed as shown in Table 3.

That is, the addition order was changed to (a)→(d)→(c)→(b) in Example 2, (a)→(b)→(d)→(c) in Example 3 and (d)→(a)→(b)→(c) in Example 4.

In all of Examples 2-4, the yield and trans1,4 bond content of the obtained polymer were both as high as in Example 1.

EXAMPLE 5

A dried 5-liter reactor provided with a stirrer and a jacket was purged with nitrogen. Into this reactor were charged 500 g of 1,3-butadiene and 2,000 g of purified and dried cyclohexane.

In a 100-ml pressure bottle containing a rotor was placed 2.4 millimoles of (a) dinonylphenoxybarium in a dry nitrogen atmosphere while stirring it with a magnetic stirrer. Then, (b) triethylaluminum, (c) n-butyllithium and (d) diethylaminoethanol were added in the molar ratio and addition order shown in Table 4. The mixture was subjected to aging at 80° C. for 15 minutes to prepare a catalyst composition.

The total amount of this catalyst composition was placed in the above reactor at one time. The mixture was subjected to polymerization at 70° C. for 90 minutes.

The polymerization yield and the analytical results of the obtained polybutadiene are shown in Table 4.

EXAMPLE 6

Copolymerization was effected by repeating the same procedure as in Example 5, except that the 1,3-butadiene was replaced by 125 g of styrene and 375 g of 1,3-butadiene.

The copolymer yield and the analytical results of the obtained styrene-butadiene copolymer are shown in Table 4.

EXAMPLE 7

Cyclohexane and 1,3-butadiene were fed in the same manner as in Example 5.

Then, the reactor was heated to 55° C. Thereto was added the same polymerization catalyst as in Example 5 in the same amount as in Example 5, to initiate polymerization.

Thereafter, temperature-elevating polymerization was conducted with stirring at 2 rpm, without conducting cooling. In 30 minutes, the temperature inside the reactor reached 110° C. and the conversion of 1,3-butadiene was 84%. Stirring was continued for a further 30 minutes, and the polymerization reaction was stopped.

The polymer yield and the analytical results of the obtained polybutadiene are shown in Table 4.

EXAMPLES 8-16

Polymerization was effected by repeating the same procedure as in Example 1, except that the component (d) used in Example 1 was changed to those shown in Table 5.

That is, there were used, as component (d), dimethylaminoethanol (Example 8), dibutylaminoethanol (Example 9), tetrahydrofurfuryl alcohol (Example 10), ethylene glycol monophenyl ether (Example 11), 1-piperidineethanol (Example 12), N-$\beta$-hydroxyethyl-morpholine (Example 13), 1-piperazineethanol (Example 14), N,N'-bis($\beta$-hydroxyethyl)piperazine (Example 15) and 2-($\beta$-hydroxyethyl)pyridine (Example 16). In all of the Examples, the polymer yield was 96% or more and the trans-1,4 bond content was very high, namely 83–88%.

EXAMPLES 17-19

Polymerization was effected by repeating the same procedure as in Example 7, except that the component (a) used in Example 7 was changed to those shown in Table 6.

That is, there were used, as component (a), barium di-tert-butoxide (Example 17), barium di(2-ethylhexanoxide) (Example 18) and barium di(p-butylphenoxide) (Example 19).

In all of the Examples, the polymer yield was 96% or more and the trans-1,4 bond content was very high, namely 87–88%.

TEST EXAMPLES 1-3 AND COMPARATIVE TEST EXAMPLES 1-2

The polymers obtained in Examples 5, 6 and 7, a high cis polybutadiene and a styrene-butadiene copolymer obtained by solution polymerization were vulcanized to obtain vulcanizates of Test Examples 1, 2 and 3 and Comparative Test Examples 1 and 2, respectively. The vulcanizates were measured for physical properties and the results are shown in Table 7.

Each rubber was kneaded according to the compounding recipe shown below by a 230-cc Brabender and a 6-inch roll. Each compound obtained was vulcanized at 145° C. for 18 minutes to obtain a vulcanizate. Each vulcanizate was measured for physical properties.

| Compounding recipe | |
|---|---|
| Rubber | 100 parts |
| Carbon black (HAF) | 50 parts |
| Stearic acid | 2 parts |
| Zinc white | 3 parts |
| Antioxidant (810 NA)*[1] | 1 part |
| Antioxidant (TP)*[2] | 0.8 part |
| Vulcanization accelerator (DPG)*[3] | 0.6 part |
| Vulcanization accelerator (DM)*[4] | 1.2 parts |
| Sulfur | 1.5 parts |

*[1]N-phenyl-N'-isopropyl-p-phenylenediamine
*[2]Sodium dibutyldithiocarbamate
*[3]Diphenylguanidine
*[4]Dibenzothiazyl sulfide Tensile properties were measured according to JIS K 6301.

Impact resilience is an impact resilience at 80° C. measured by a Dunlop tripsometer.

Lambourn abrasion resistance index was expressed by an amount of abrasion at a slip percentage of 25% when the abrasion amount was measured by a Lambourn abrasion tester. The measurement temperature was room temperature. A larger Lambourn abrasion resistance index shows better abrasion resistance.

Internal loss (tan $\delta$) was measured by a dynamic spectrometer manufactured by Rheometrics in U.S.A., under the conditions of a dynamic strain of tension of 0.1%, a frequency of 10 Hz and a temperature of 50° C.

TABLE 1

| | Catalyst components | | | | Molar ratio of catalyst components |
|---|---|---|---|---|---|
| | Component (a) | Component (b) | Component (c) | Component (d) | (a)/(b)/(c)/(d) |
| Example 1 | Dinonylphenoxy-barium *2 | Triethyl-aluminum | n-Butyllithium | Diethylamino-ethanol | 1/4/5/2 |
| Comparative Example 1 | Dinonylphenoxy-barium *2 | Triethyl-aluminum | " | Not used | 1/4/2/0 |
| Comparative Example 2 | Dinonylphenoxy-barium *2 | Triethyl-aluminum | " | " | 1/4/3/0 |
| Comparative Example 3 | Dinonylphenoxy-barium *2 | Triethyl-aluminum | " | " | 1/5/1/0 |
| Comparative Example 4 | Dinonylphenoxy-barium *2 | Triethyl-aluminum | Not used | Diethylamino-ethanol | 1/4/0/2 |
| Comparative Example 5 | Dinonylphenoxy-barium *2 | Triethyl-aluminum | " | Diethylamino-ethanol | " |
| Comparative Example 6 | Dinonylphenoxy-barium *2 | Not used | n-Butyllithium | Diethylamino-ethanol | 1/0/5/2 |
| Comparative Example 7 | Not used | Triethyl-aluminum | " | Diethylamino-ethanol | 0/4/5/2 |

| Addition order of catalyst components | Aging of catalyst mixture *1 | Polymer yield (%) | Mooney viscosity (ML$_{1+4}$, 100° C.) | Microstructure of polybutadiene (%) | | | GPC analysis | |
|---|---|---|---|---|---|---|---|---|
| | | | | Trans-1,4 | Cis-1,4 | Vinyl | Mw × 10$^{-4}$ | Mw/Mn |
| (a) → (d) → (b) → (c) | Yes | 98 | 59 | 87 | 9 | 4 | 38.3 | 1.6 |
| (a) → (b) → (c) | " | 0 | — | — | — | — | — | — |
| " | " | 0 | — | — | — | — | — | — |
| " | " | 0 | — | — | — | — | — | — |
| (a) → (d) → (b) | " | 0 | — | — | — | — | — | — |
| (a) → (b) → (d) | " | 0 | — | — | — | — | — | — |
| (a) → (d) → (c) | " | 83 | 85 | 62 | 26 | 12 | 63.5 | 2.8 |

TABLE 1-continued

| | | | | | | | |
|---|---|---|---|---|---|---|---|
| (d) → (b) → (c) | " | 0 | — | — | — | — | — | — |

Note:
*1: A preliminary reaction (aging) was effected at 80° C. for 15 minutes.
*2: Dinonylphenoxy barium as component (a) was used in an amount of 0.12 mM per 25 g of 1,3-butadiene.

TABLE 2

| | Catalyst components | | | | Molar ratio of catalyst components (a)/(b)/(c)/(d) | Addition order of catalyst components | Aging of catalyst mixture | Polymer yield (%) |
|---|---|---|---|---|---|---|---|---|
| | Component (a) | Component (b) | Component (c) | Component (d) | | | | |
| Comparative Example 8 | Dinonyl-phenoxy-barium | Tri-ethyl-aluminum | n-Butyl-lithium | Not used | 1/4/2/0 | (a) → (d) → (b) → (c) | Yes | 0 |
| Comparative Example 9 | Dinonyl-phenoxy-barium | Tri-ethyl-aluminum | Not used | Diethyl-amino-ethanol | 1/4/0/2/ | (a) → (d) → (b) | " | 0 |
| Comparative Example 10 | Dinonyl-phenoxy-barium | Tri-ethyl-aluminum | Not used | Diethyl-amino-ethoxy-lithium | " | " | " | 0 |

TABLE 3

| | Molar ratio of catalyst components (a)/(b)/(c)/(d) | Addition order of catalyst components | Aging of catalyst mixture | Polymer yield (%) | Mooney viscosity (ML$_{1+4}$, 100° C.) | Microstructure of polybutadiene (%) | | | GPC analysis | |
|---|---|---|---|---|---|---|---|---|---|---|
| | | | | | | Trans-1,4 | Cis-1,4 | Vinyl | Mw × 10$^{-4}$ | Mw/Mn |
| Example 2 | 1/4/5/2 | (a) → (d) → (c) → (b) | Yes | 98 | 26 | 84 | 10 | 6 | 24.9 | 1.8 |
| Example 3 | " | (a) → (b) → (d) → (c) | " | 98 | 45 | 87 | 9 | 4 | 33.5 | 1.4 |
| Example 4 | " | (d) → (a) → (b) → (c) | " | 98 | 55 | 87 | 9 | 4 | 37.6 | 1.5 |

TABLE 4

| | Catalyst components | | | | Molar ratio of catalyst components (a)/(b)/(c)/(d) |
|---|---|---|---|---|---|
| | Component (a) | Component (b) | Component (c) | Component (d) | |
| Example 5 | Dinonylphenoxy-barium *2 | Triethyl-aluminum | n-Butyllithium | Diethylamino-ethanol | 1/4/5/2 |
| Example 6 | Dinonylphenoxy-barium *2 | Triethyl-aluminum | " | Diethylamino-ethanol | " |
| Example 7 | Dinonylphenoxy-barium *2 | Triethyl-aluminum | " | Diethylamino-ethanol | " |

| Addition order of catalyst components | Aging of catalyst mixture | Polymer yield (%) | Mooney viscosity (ML$_{1+4}$, 100° C.) | Microstructure of polybutadiene portion (%) | | | Bound styrene content (%) | GPC analysis | |
|---|---|---|---|---|---|---|---|---|---|
| | | | | Trans-1,4 | Cis-1,4 | Vinyl | | Mw × 10$^{-4}$ | Mw/Mn |
| (a) → (d) → (b) → (c) | Yes | 98 | 55 | 87 | 9 | 4 | — | 36.8 | 1.5 |
| " | " | 90 | 45 | 83 | 13 | 4 | 18 | 31.5 | 1.6 |
| " | " | 94 | 50 | 84 | 11 | 5 | — | 36.0 | 1.5 |

Note:
*1: Dinonylphenoxy barium as component (a) was used in an amount of 2.4 mM per 500 g of 1,3-butadiene.

TABLE 5

| | Catalyst components Component (d) | Molar ratio of catalyst components (a)/(b)/(c)/(d) | Polymer yield (%) | Mooney viscosity (ML$_{1+4}$, 100° C.) | Microstructure of polybutadiene (%) | | | GPC analysis | |
|---|---|---|---|---|---|---|---|---|---|
| | | | | | Trans-1,4 | Cis-1,4 | Vinyl | Mw × 10$^{-4}$ | Mw/Mn |
| Example 8 | Diethylaminoethanol | 1/4/5/2 | 98 | 40 | 88 | 8 | 4 | 30.1 | 1.6 |
| Example 9 | Dibutylaminoethanol | " | 97 | 47 | 84 | 10 | 6 | 33.5 | 1.7 |
| Example 10 | Tetrahydrofurfuryl | " | 96 | 55 | 84 | 10 | 6 | 37.0 | 1.8 |

TABLE 5-continued

| | Catalyst components Component (d) | Molar ratio of catalyst components (a)/(b)/ (c)/(d) | Polymer yield (%) | Mooney viscosity (ML$_{1+4}$, 100° C.) | Microstructure of polybutadiene (%) | | | GPC analysis | |
|---|---|---|---|---|---|---|---|---|---|
| | | | | | Trans-1,4 | Cis-1,4 | Vinyl | Mw × 10$^{-4}$ | Mw/Mn |
| Example 10 | alcohol | | | | | | | | |
| Example 11 | Ethylene glycol monophenyl ether | " | 97 | 50 | 83 | 11 | 6 | 36.4 | 1.7 |
| Example 12 | 1-Piperidineethanol | " | 97 | 47 | 87 | 9 | 4 | 33.1 | 1.7 |
| Example 13 | N-β-hydroxyethyl-morpholine | " | 98 | 60 | 85 | 10 | 5 | 39.1 | 1.6 |
| Example 14 | 1-Piperazine ethanol | " | 97 | 48 | 86 | 9 | 5 | 34.0 | 1.7 |
| Example 15 | N,N'-bis(β-hydroxyethyl)piperazine | 1/4/5/1 | 96 | 43 | 87 | 8 | 5 | 32.1 | 2.0 |
| Example 16 | 2-(β-Hydroxyethyl)pyridine | 1/4/5/2 | 96 | 62 | 83 | 11 | 6 | 40.0 | 1.8 |

TABLE 6

| | Catalyst components Component (a) | Polymer yield (%) | Mooney viscosity (ML$_{1+4}$, 100° C.) | Microstructure of polybutadiene (%) | | | GPC analysis | |
|---|---|---|---|---|---|---|---|---|
| | | | | Trans-1,4 | Cis-1,4 | Vinyl | Mw × 10$^{-4}$ | Mw/Mn |
| Example 17 | Barium di-tert-butoxide | 95 | 45 | 87 | 9 | 4 | 36.2 | 1.9 |
| Example 18 | Barium di(2-ethylhexanoxide) | 98 | 48 | 88 | 8 | 4 | 34.2 | 1.5 |
| Example 19 | Barium di(p-butylphenoxide) | 97 | 55 | 87 | 9 | 4 | 38.0 | 1.6 |

TABLE 7

| | Test Example 1 | Test Example 2 | Test Example 3 | Comparative Test Example 1 | Comparative Test Example 2 |
|---|---|---|---|---|---|
| Rubber (parts) | Example 5 (100) | Example 6 (100) | Example 7 (100) | High cis BR (100) | SBR by solution polymerization (100) |
| Physical properties of vulcanizate | | | | | |
| 30% modulus (kg · f/cm$^2$) | 166 | 162 | 160 | 131 | 162 |
| Tensile strength (kg · f/cm$^2$) | 261 | 258 | 260 | 179 | 234 |
| Elongation (%) | 520 | 510 | 520 | 400 | 400 |
| Impact resilience (%) | 77 | 72 | 75 | 75 | 71 |
| Lambourn abrasion resistance index | 155*[1] | 125*[2] | 160*[1] | 100*[1] | 100*[2] |
| tan δ | 0.096 | 0.105 | 0.098 | 0.110 | 0.118 |

Note:
*[1] The Lambourn abrasion resistance index of a high cis polybutadiene (high cis BR) was set at 100. A larger Lambourn abrasion resistance index shows better abrasion resistance.
*[2] The Lambourn abrasion resistance index of a styrene-butadiene copolymer (SBR, bound styrene content = 18%, Mooney viscosity = 45, Mw/Mn = 2.5) obtained by solution polymerization was set at 100.

What is claimed is:

1. A process for producing a high trans low vinyl conjugated diene (co)polymer, comprising polymerizing at least one conjugated diene alone or in combination with an alkenyl compound in an inert organic solvent, using a catalyst composition comprising (a) a barium compound, (b) an organoaluminum compound, (c) an organolithium compound, and (d) a hydroxyl group-containing organic compound which is at least one compound selected from the group consisting of the compounds represented by formulas (II)–(IX):

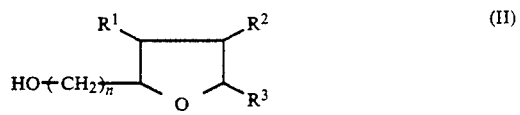
(II)

wherein R$^1$ to R$^3$, which may be the same different, are hydrogen atoms, alkyl groups of 1–20 carbon atoms or aryl groups of 6–20 carbon atoms, and n is an integer of 1–3,

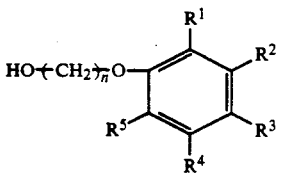

wherein R¹ to R³ have the same meanings as defined above, R⁴ to R⁵ have the same meanings as R¹ and R³, and n has the same meaning as defined above,

wherein R¹ and n have the same meanings as defined above, and m is 0 or an integer of 1-2,

wherein R⁶ is an alkylene group of 3-10 carbon atoms, and n has the same meaning as defined above,

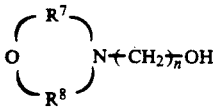

wherein R⁷ and R⁸ which may be the same or different, are alkylene groups of 2-5 carbon atoms, and n has the same meaning as defined above,

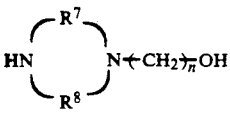

wherein R⁷, R⁸ and n have the same meanings as defined above,

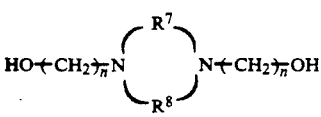

wherein R⁷, R⁸ and n have the same meanings as defined above, and

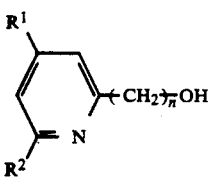

wherein R¹, R² and n have the same meanings as defined above, said catalyst composition being prepared by mixing (a), (b) and (d) together to form a mixture, followed by reacting (c) with said mixture.

2. The process according to claim 1, wherein the barium compound (a) is at least one compound selected from the group consisting of barium dimethoxide, barium diethoxide, barium diisopropoxide, barium di-n-butoxide, barium di-sec-butoxide, barium di-tert-butoxide, barium di(1,1-dimethylpropoxide), barium di(1,2-dimethylpropoxide), barium di(1,1-dimethylbutoxide), barium di(1,1-dimethylpentoxide), barium di(2-ethylhexanoxide), barium di(1-methylheptoxide), barium diphenoxide, barium di(p-methylphenoxide), barium di(p-butylphenoxide), barium di(o-methylphenoxide), barium di(p-octylphenoxide), barium di(p-nonylphenoxide), barium di(p-dodecylphenoxide), barium di(α-naphthoxide), barium di(β-naphthoxide), barium (o-methoxyphenoxide), barium di(m-methoxyphenoxide), barium di(p-methoxyphenoxide), barium (o-ethoxyphenoxide) and barium di(4-methoxy-1-naphthoxide).

3. The process according to claim 1, wherein the barium compound (a) is barium di-tert-butoxide, barium di(2-ethylhexanoxide) or barium di(p-nonylphenoxide).

4. The process according to claim 1, wherein the barium compound (a) is used in a proportion of 0.05-1 millimole in terms of barium atom, per mole of the conjugated diene.

5. The process according to claim 1, wherein the barium compound (a) is used in a proportion of 0.1-0.5 millimole in terms of barium atom, per mole of the conjugated diene.

6. The process according to claim 1, wherein the organoaluminum compound (b) is a trialkylaluminum.

7. The process according to claim 6, wherein the trialkylaluminum is at least one compound selected from the group consisting of trimethylaluminum, triethylaluminum, triisopropylaluminum, tributylaluminum, triisobutylaluminum, trihexylaluminum and tricyclohexylaluminum.

8. The process according to claim 6, wherein the trialkylaluminum is triethylaluminum.

9. The process according to claim 1, wherein the organolithium compound (c) is at least one compound selected from the group consisting of ethyllithium, propyllithium, n-butyllithium, sec-butyllithium, tert-butyllithium, hexyllithium, 1,4-dilithiobutane, a reaction product of butyllithium with divinylbenzene, alkylenedilithiums, phenyllithium, stilbenedilithium, isopropenylbenzenedilithium and lithiumnaphthalene.

10. The process according to claim 1, wherein the organolithium compound (c) is n-butyllithium or sec-butyllithium.

11. The process according to claim 1, wherein the hydroxyl group-containing organic compound (d) is at least one compound selected from the group consisting of tetrahydrofurfuryl alcohol, 3-methyltetrahydrofurfuryl alcohol, 4-ethyltetrahydrofurfuryl alcohol, an oligomer of tetrahydrofurfuryl, ethylene glycol monophenyl ether, N,N-dimethylenthanolamine, N,N-diethylethanolamine, N,N-dibutylethanolamine, N,N-diphenylethanolamine, N-methyl-diethanolamine, N-ethyldiethanolamine, N-butyldiethanolamine, N-phenyldiethanolamine, N,N-dimethylpropanolamine, N,N-dibutylpropanolamine, N-methyldipropanolamine, N-ethyldipropanolamine, 1-(2-hydroxyethyl)pyrrolidine, 2-methyl-1-(2-hydroxyethyl)pyrrolidine, 2-methyl-1-(3-hydroxypropyl)pyrrolidine, 1-piperidineethanol, 2-phenyl-1-piperidineethanol, 2-ethyl-1-piperidinepropanol, N-β-hydroxyethylmorpholine, 2-ethyl-N-β-hydroxyethylmorpholine, 1-piperazineethanol, 1-piperazinepropanol, N,N'-bis(β-hydroxyethyl)piperazine, N,N'-bix(γ-hydroxyethyl)piperazine, 2-(β-hydroxyethyl)pyridine and 2-(γ-hydroxyethyl)pyridine.

12. The process according to claim 1, wherein the hydroxyl group-containing organic compound (d) is tetrahydrofurfuryl alcohol, N,N-diethylethanolamine or 1-piperidineethanol.

13. The process according to claim 1, wherein component (a)/component (b)/component (c)/component (d) (molar ratio) is 1/1-10/1-10/1-5.

14. The process according to claim 1, wherein component (a)/component (b)/component (c)/component (d) (molar ratio) is 1/2-7/3-7/1.2-4.

15. The process according to claim 1, wherein the catalyst composition comprises a conjugated diene in a proportion of 0.05-20 moles per mole of component (a).

16. The process according to claim 15, wherein the conjugated diene is isoprene, 1,3-butadiene or 1,3-pentadiene.

17. The process according to claim 1, wherein the conjugated diene is selected from the group consisting of 1,3-butadiene, isoprene, 2,3-dimethyl-1,3-butadiene, 1,3-pentadiene and myrcene.

18. The process according to claim 1, wherein the conjugated diene is selected from the group consisting of 1,3-butadiene and isoprene.

19. The process according to claim 1, wherein the alkenyl compound is at least one compound selected from the group consisting of alkenyl aromatic compounds, vinylpyridine, acrylonitrile, methacrylonitrile, methylacrylonitrile, methylmethacrylonitrile and acrylic acid esters.

20. The process according to claim 1, wherein the alkenyl compound is an alkenyl aromatic compound.

21. The process according to claim 20, wherein the alkenyl aromatic compound is selected from the group consisting of styrene, $\alpha$-methylstyrene, p-methylstyrene, o-methylstyrene, p-butylstyrene and vinylnaphthalene.

22. The process according to claim 20, wherein the alkenyl aromatic compound is styrene.

23. The process according to claim 1, wherein the inert organic solvent is an aromatic hydrocarbon solvent, an aliphatic hydrocarbon solvent, an alicyclic hydrocarbon solvent or a mixture thereof.

24. The process according to claim 1, wherein the inert organic solvent is at least one solvent selected from the group consisting of benzene, toluene, xylene, n-pentane, n-hexane, n-heptane, methylcyclopentane and cyclohexane.

25. The process according to claim 1, wherein the polymerization temperature is $-20°$ to $150°$ C.

26. The process according to claim 1, wherein the monomer concentration in the solvent is 5-50% by weight.

* * * * *